United States Patent
Gerhardt-Hansen et al.

(10) Patent No.: US 11,254,509 B2
(45) Date of Patent: Feb. 22, 2022

(54) DRIVE WHEEL FOR DRIVING A FEED CHAIN FOR THE DRY FEEDING OF LIVESTOCK

(71) Applicant: BIG DUTCHMAN INTERNATIONAL GMBH, Vechta (DE)

(72) Inventors: Anders Gerhardt-Hansen, Svenborg (DK); Hugo Styrbaek Holm, Egtved (DK); Christian Tobergte, Hasbergen (DE)

(73) Assignee: BIG DUTCHMAN INTERNATIONAL GMBH, Vechta (DE)

( * ) Notice: Subject to any disclaimer, the term of this patent is extended or adjusted under 35 U.S.C. 154(b) by 261 days.

(21) Appl. No.: 16/574,138

(22) Filed: Sep. 18, 2019

(65) Prior Publication Data

US 2020/0087075 A1    Mar. 19, 2020

(30) Foreign Application Priority Data

Sep. 19, 2018    (LU) .................................... 100931

(51) Int. Cl.
*B65G 23/34* (2006.01)
*B65G 23/00* (2006.01)
*A01K 5/02* (2006.01)
*F16H 55/30* (2006.01)

(52) U.S. Cl.
CPC ............... *B65G 23/34* (2013.01); *A01K 5/02* (2013.01); *F16H 55/30* (2013.01); *F16H 2055/306* (2013.01)

(58) Field of Classification Search
None
See application file for complete search history.

(56) References Cited

U.S. PATENT DOCUMENTS

| 1,870,801 A | 8/1932 | Engstrom |
| 3,675,758 A * | 7/1972 | Buschbom ........... A01K 5/0266 198/371.2 |
| 5,980,408 A | 11/1999 | Schulz |
| 7,406,892 B2 * | 8/2008 | Takeuchi ................ F16H 55/16 74/409 |
| 2003/0195072 A1 | 10/2003 | Redmond |
| 2008/0234084 A1 | 9/2008 | Ackerman |

(Continued)

FOREIGN PATENT DOCUMENTS

| CN | 1603665 | 4/2005 |
| CN | 1646830 | 7/2005 |

(Continued)

OTHER PUBLICATIONS

Tewe Elektronic, Tewe Innovation, Rev. 1, Blatt 2 von 4, Neuigkeiten 2016 (Sep. 28, 2016).

*Primary Examiner* — Kavel Singh
(74) *Attorney, Agent, or Firm* — Price Heneveld LLP

(57) ABSTRACT

A drive wheel for driving a feed chain for dry-feeding livestock includes a base wheel having an axial passage for receiving a drive shaft and a gear rim having a toothed external circumferential face, wherein the external circumferential face has a multiplicity of tooth elements. Each tooth element has two tooth tips and one chain clearance disposed between the two tooth tips. At least the gear rim composed of an elastic material.

15 Claims, 7 Drawing Sheets

(56) References Cited

U.S. PATENT DOCUMENTS

| | | |
|---|---|---|
| 2009/0008223 A1 | 1/2009 | Fujii |
| 2015/0176692 A1 | 6/2015 | Roh |
| 2016/0245374 A1 | 8/2016 | Ebert et al. |

FOREIGN PATENT DOCUMENTS

| | | |
|---|---|---|
| CN | 104455323 | 3/2015 |
| CN | 106838249 | 6/2017 |
| DE | 8114099 | 10/1982 |
| DE | 8805824 | 7/1988 |
| DE | 20111493 | 11/2002 |
| DE | 202012104212 | 2/2014 |
| DE | 202014100830 | 4/2014 |
| EP | 0068475 | 1/1983 |
| EP | 1175832 | 1/2002 |
| JP | 2004044659 | 2/2004 |
| JP | 2007118228 | 5/2007 |
| WO | 2009053165 | 3/2013 |

* cited by examiner

DRIVE WHEEL FOR DRIVING A FEED CHAIN FOR THE DRY FEEDING OF LIVESTOCK

CROSS-REFERENCE TO FOREIGN PRIORITY APPLICATION

The present application claims the benefit under 35 U.S.C. §§ 119(b), 119(e), 120, and/or 365(c) Luxembourg Application No. LU 100931 filed Sep. 19, 2018.

FIELD OF THE INVENTION

The invention relates to a drive wheel for driving a feed chain for dry-feeding livestock, to a feeding system for dry-feeding livestock, to a gear rim for a drive wheel, to a method for producing a drive wheel, to a method for driving a feed chain for dry-feeding livestock, to a method for refurbishing a drive wheel for driving a feed chain for dry-feeding livestock, and to the use of a drive wheel in a feeding system for dry-feeding livestock.

BACKGROUND OF THE INVENTION

Dry feed in the form of meal, crumbs, or pellets is often transported and metered in livestock farming, in particular pig farming. Feeding systems for dry-feeding are used to this end. Such a feeding system transports the dry feed from a feed silo by way of an onward line to feeding stations, for example, for feeding individual animals, for supplying automatic feeders for breeding piglets, or for fattening pigs, or for supplying on-demand feeding stations for pregnant sows in group pens. The feed line in most instances comprises a conveyor pipe having a feed chain on which baffle disks are disposed. The feed chain is driven by way of a drive station and is moved through the conveyor pipe, wherein feed from the feed silo makes its way between the baffle disks and by the latter is moved through the conveyor pipe to the feeding stations Further improvements to the drive unit are desirable in particular for large feeding systems having long feed lines.

SUMMARY OF THE INVENTION

It is, therefore, an object of the present invention to provide an improved drive wheel for driving a feed chain for dry-feeding livestock, an improved feeding system for dry-feeding livestock, an improved gear rim for a drive wheel, an improved method for producing a drive wheel, an improved method for driving a feed chain for dry-feeding livestock, an improved method for refurbishing a drive wheel for driving a feed chain for dry-feeding livestock, and an improved use of a drive wheel in a feeding system for dry-feeding livestock. It is, in particular, an object of the present invention to provide a drive wheel for driving a feed chain for dry-feeding livestock, a feeding system for dry-feeding livestock, a gear rim for a drive wheel, a method for producing a drive wheel, a method for driving a feed chain for dry-feeding livestock, a method for refurbishing a drive wheel for driving a feed chain for dry-feeding livestock, and a use of a drive wheel in a feeding system for dry-feeding livestock which are more cost-effective and/or offer more capacity as compared to existing solutions. It is furthermore an object of the present invention to provide a drive wheel for driving a feed chain for dry-feeding livestock, a feeding system for dry-feeding livestock, a gear rim for a drive wheel, a method for producing a drive wheel, a method for driving a feed chain for dry-feeding livestock, a method for refurbishing a drive wheel for driving a feed chain for dry-feeding livestock, and a use of a drive wheel in a feeding system for dry-feeing livestock which have a positive effect on the well-being of the animals.

This object is achieved according to the invention by a drive wheel for driving a feed chain for dry-feeding livestock, comprising a base wheel having an axial passage for receiving a drive shaft, a gear rim having a toothed external circumferential face, wherein the external circumferential face has a multiplicity of tooth elements, wherein each tooth element has two tooth tips and one chain clearance that is disposed between the two tooth tips, wherein the gear rim comprises an elastic gear rim material or is composed thereof.

The drive wheel for driving a feed chain for dry-feeding livestock comprises a base wheel which has an axial passage in which the drive shaft of a drive of a drive unit of a feeding system can be received. The drive wheel furthermore has a gear rim which has a toothed external circumferential face. The external circumferential face of the gear rim has a multiplicity of tooth elements. Each of said tooth elements has two tooth tips which are preferably spaced apart in the axial direction. A chain clearance is configured between the two tooth tips. In order for a feed chain be driven, the feed chain is preferably guided over the drive wheel such that the baffle disks of the feed chain come to engage with the tooth elements of the drive wheel, wherein the chain links or cable portions of the feed chain between the baffle disks run through the chain clearance. The feed chain is preferably configured as a continuous feed chain.

In the case of the drive wheel described here it is provided that the gear rim comprises an elastic gear rim material or is composed thereof.

The elastic gear rim material permits the gear rim, in particular, the tooth elements that come into contact with the baffle disks of a feed chain, to be able to deform under stress. Stress here is, in particular, understood to be the forces which are created in that torques which are transmitted by the drive to the drive wheel by way of the drive shaft are passed on by the tooth elements to the baffle disks. The longer the feed chain is driven and/or the more feed is to be conveyed along the feed line by means of the feed chain, the greater the required drive output and the greater also the stress of the gear rim and, in particular, of the tooth elements. Accordingly, the elastic deformation of the tooth elements preferably also increases in the case of increasing stress.

Such an elastic deformation of the gear rim, in particular, of the tooth elements which are in each case stressed the most heavily, has various advantages. For example, this has the effect that a larger number of baffle disks simultaneously come into contact with tooth elements as opposed to gear rims from non-elastic or less elastic material and, in particular, in the case of high stress. The reason therefor is, in particular, also that the spacings between neighboring baffle disks of a feed chain in practice are in most instances not of identical size, for example, by virtue of torsioning in the feed chain, for instance, by torsioning of the chain links or cable portions between the baffle disks, or else on account of production tolerances in the production of the chain or on account of evidence of wear such as the displacement of the baffle disks on the chain links, or else on account of abrasion on the baffle disks. An elastic gear rim material permits an elastic deformation of the tooth elements in such a manner that said tooth elements under stress adapt to the dissimilar spacings between the baffle disks and in this way at the same time a larger number of baffle disks come to engage with a correspondingly larger number of tooth elements. In this way it is possible for a greater drive output to be transmitted to the feed chain since a correspondingly larger number of tooth elements are available to this end. Longer feed lines and/or larger quantities of feed can be served on account thereof. In comparison to existing drive wheels, in which the gear rim is configured so as to be non-elastic or less elastic and is composed, for example, from glass-fiber-reinforced polyamide (PA6 GF30), driving feed chains along feed lines which are longer than approximately 400 m is currently not possible.

The invention is based inter alia on the concept that shock and vibration movements are created in known feed chain systems, in particular, when starting up the chain and within the operation in the case of comparatively high stress to the chain, for example, on account of a temporarily increased friction or resistance in the conveyor system. The electrical drive can be regulated in a corresponding manner in order for this tendency toward vibrations to be mitigated. To this end, electronic close-loop control systems, which are already known from other fields of application, can be used for soft starting and soft stopping. However, these solutions are rather expensive since the closed-loop control systems have to react rapidly and must not tend to support any vibration of the chain system, the latter potentially arising in the case of a closed-loop control system of wrong design. Apart from the closed-loop control unit, expensive power components which are capable of actuating the electrical drive in a manner corresponding to the control parameters are additionally required. The latter could be performed, for example, by way of frequency inverters or by way of pulse-width modulated actuations.

It is a further advantage of the solution according to the invention that the elastic gear rim material and the elastic deformation of the tooth elements under stress made possible on account thereof enable the feed chain to run in and out of the drive wheel in a softer manner. An overall more uniform profile of the feed chain in the conveyor pipe can be achieved in this way, and so-called "beating" of the feed chain can be minimized or even prevented. Increased wear on the conveyor pipe and/or the feed chain arises on account of the beating of the chain against the conveyor pipe, on the one hand. At the same time, a significant degree of noise pollution is created by the beating of the chain. The solution described here, having an elastic gear rim material, thus contributes to reduced wear, reduced noise pollution, and thus also to the well-being of the animals.

A further advantage is derived in that the use of elastic gear rim material in comparison to material used in the case of existing drive wheels can bring about cost advantages in terms of the material costs and/or the production costs.

A further advantage is furthermore derived in that existing drive units of feeding systems can also be refurbished. This can be performed, for example, by replacing the drive wheel with a drive wheel described here. This can, in particular, also be performed only by replacing a gear rim of the drive wheel with a gear rim described here. In this way, a drive unit can be refurbished in a cost-effective manner so that the advantages described here can be implemented.

An elastic gear rim material here is, in particular, understood to be a gear rim material which has a SHORE hardness A of at least 90 and/or at most 120. The SHORE hardness A can, in particular, be determined according to DIN 53505. It is particularly preferable that the gear rim material has a SHORE hardness A of at least 95 and/or at most 110, in particular of at least 100 and/or at most 105.

In one preferred embodiment, it is provided that each tooth element has one baffle disk bearing face.

The baffle disk bearing face serves, in particular, for coming into contact with a baffle disk. The contact between a tooth element and a baffle disk can also be referred to as an engagement. The torque that is transmitted from a drive to the drive wheel by way of a drive shaft is converted to an advancing movement of the feed chain by way of the contact between a tooth element and a baffle disk of a feed chain.

It is furthermore preferable that the baffle disk bearing face has a first portion and a second portion. The first portion in relation to the axial passage in the radial direction preferably has a smaller spacing than the second portion. The tooth tips are furthermore preferably configured on the second portion.

It is preferable that the first portion and the second portion of the baffle disk bearing face are inclined toward one another. One preferred refinement is distinguished in that the baffle disk bearing face, in particular, the first and/or the second portion of the baffle disk bearing face, are/is curved. It is furthermore preferable that the baffle disk bearing face, in particular, the first and/or the second portion of the baffle disk bearing face, have/has a preferably variable radius. It is furthermore preferable that the baffle disk bearing face, in particular, the first and/or the second portion of the baffle disk bearing face, have/has a contoured surface.

These design embodiments of the baffle disk bearing face, in particular, of the first and the second portion of the baffle disk bearing face, have the advantage that an improved engagement between a baffle disk and the tooth element can be achieved on account thereof. These design embodiments of the baffle disk bearing face, in particular, of the first and the second portion of the baffle disk bearing face, contribute, in particular, toward a larger number of baffle disks simultaneously coming to engagement with a correspondingly larger number of tooth elements. These design embodiments can furthermore contribute toward a baffle disk remaining longer in engagement with the baffle disk bearing face of the tooth element, in particular, across a longer distance. The transmission of a drive output from a drive to the feed chain can be improved in this way such that longer feed chains can also be driven and/or larger quantities of feed can be conveyed.

According to one preferred embodiment, it is provided that the base wheel comprises a base material, preferably an elastic base material, or is composed thereof.

According to one preferred embodiment, it is provided that the base material has a SHORE hardness A of at least 90 and/or at most 120. The SHORE hardness A can, in particular, be determined according to DIN 53505. It is particularly preferable that the base material has a SHORE hardness A of at least 95 and/or at most 110, in particular of at least 100 and/or most 105.

It is particularly preferable herein that the gear rim material and the base material are identical.

It is furthermore preferable that the gear rim material and/or the base material are/is a plastics material, in particular an elastic polymer. The gear rim material and/or the base material furthermore preferably comprise/comprises plastics material, in particular, an elastic polymer. It is, in particular, preferable that the gear rim material and/or the base material are/is polyurethane or comprise/comprises polyurethane.

According to one preferred embodiment, it is provided that the gear rim and the base wheel are configured so as to be integral. An integral configuration here is, in particular, understood to be a configuration in which the gear rim and the base wheel are simultaneously produced conjointly in a primary forming method.

One further preferred refinement is distinguished in that the gear rim and/or the base wheel are/is configured as a casting, in particular, as a vacuum casting.

A configuration as a casting is preferably the result of the primary forming method of casting. The production in a vacuum casting method in which the resulting vacuum casting has fewer or no air inclusions such as, for example, shrink holes, is particularly preferable. The configuration as a casting is preferably the result of the primary forming method of casting in an open mold.

One preferred refinement is distinguished in that the gear rim is configured so as to be split into two parts. A separation plane is preferably disposed between the first and the second parts of the gear rim, so as to be orthogonal to the axial passage. It is furthermore preferable that the base wheel is configured so as to be split into two parts. A separation plane is preferably disposed between the first and the second parts of the base wheel, so as to be orthogonal to the axial passage.

A configuration of the gear rim and/or of the base wheel split into two parts can, in particular, be preferred for reasons of production technology. A separate production of a first and of a second part of the gear rim, or of a first and a second part of the base wheel, respectively, can be preferable, in particular, by virtue of the configuration of two tooth tips having a chain clearance disposed therebetween per tooth element. In order for the drive wheel to be formed, the first and the second parts of the gear rim, and the first and the second parts of the base wheel, respectively, are in this instance preferably joined together at the separation plane of said parts.

According to one preferred embodiment, it is provided that the first part of the gear rim and the first part of the base wheel are configured so as to be integral. In one further preferred embodiment, it is provided that the second part of the gear rim and the second part of the base wheel are configured so as to be integral.

It is furthermore preferably provided that the first part of the gear rim and the first part of the base wheel are configured as a casting, in particular, as a vacuum casting. It is furthermore preferable that the second part of the gear rim and the second part of the base wheel are configured as a casting, in particular, as a vacuum casting.

It can, in particular, be preferable that a face of the casting which in production does not bear on a mold but forms a free surface forms the separation plane.

One further refined embodiment provides that the gear rim and/or the base wheel are configured so as to be split in two in such a manner that the respective first and second parts can be assembled in more than one manner, in particular, in more than two manners, so as to form the gear rim or the base wheel, respectively. The gear rim and the base wheel, respectively, preferably have dissimilar properties (for example, a suitability for different feed chains and/or a different radius in particular in the region of the separation plane), depending on the manner in which the two parts are assembled. It is, in particular, preferable that, in each case, the two parts have more than one, in particular, two, faces which are suitable as a separation plane.

In one further preferred embodiment, it is provided that a first lateral face of the base wheel is recessed in relation to the gear rim and preferably forms a first receptacle for a first stabilizer disk. It is furthermore preferable that a second lateral face of the base wheel is recessed in relation to the gear rim and preferably forms a second receptacle for a second stabilizer disk.

One further preferred refinement is distinguished in that a first stabilizer disk is disposed in the first receptacle of the first lateral face of the base wheel. It is furthermore preferably provided that a second stabilizer disk is disposed in the second receptacle of the second lateral face of the base wheel.

The first receptacle for a first stabilizer disk and/or the second receptacle for a second stabilizer disk and/or the first stabilizer disk and/or the second stabilizer disk are/is preferably disposed so as to be coaxial with the axial passage. Furthermore, preferably, the axial passage extends through the base wheel and through the first stabilizer disk and/or through the second stabilizer disk. Furthermore, preferably, the first receptacle for a first stabilizer disk in the axial direction is disposed so as to be opposite to the second receptacle for a second stabilizer disk. Furthermore, preferably, the first stabilizer disk in the axial direction is disposed so as to be opposite the second stabilizer disk. Furthermore, preferably, the first and the second receptacle in the axial direction are, in each case, disposed so as to be outside the base wheel. Furthermore, preferably, the first and the second stabilizer disk in the axial direction are in each case disposed so as to be outside the base wheel.

The provision of receptacles for stabilizer disk has the advantage that reinforcing and stabilizing the drive wheel can be performed in the region of the base wheel. In particular, on account of the use of an elastic gear rim material and/or of an elastic base material it can be preferable to reinforce the material properties of the drive wheel in the region of the base wheel. The stabilizer disk herein preferably also has the function of enabling the transmission of force from the drive shaft to the base wheel. The transmission of force from the drive shaft to the hub preferably takes place by way of a shaft-to-hub connection. A connector plate is preferably connected to the hub in a force-fitting and/or form-fitting and/or materially integral manner. The transmission of force to the stabilizer disk preferably takes place by way of a load protection which is configured as a constricted sheet-metal part, for example. It is preferably provided that the stabilizer disk thereafter transmits the force to the base wheel.

It is particularly preferable herein that the first stabilizer disk comprises a first stabilizer material or is composed thereof. It is furthermore preferable that the second stabilizer disk comprises a second stabilizer material or is composed thereof. It is, in particular, preferable that the first and/or the second stabilizer material are/is configured so as to be non-elastic or less elastic than the gear rim material and/or the base material.

The first and the second stabilizer material are preferably identical. One preferred refinement is distinguished in that the first and/or the second stabilizer material is steel or comprises steel, in particular, is stainless steel or comprises stainless steel. It is furthermore preferable that the first and/or the second stabilizer material is a steel casting or comprises a steel casting. It is furthermore preferable that the first and/or the second stabilizer material is steel sheet or comprises steel sheet, in particular, is galvanized steel sheet or comprises galvanized steel sheet.

Further advantageous variants of embodiment of the device described above are derived by combining the preferred features discussed here.

According to one further aspect of the invention, the object mentioned at the outset is achieved by a feeding system for dry-feeding livestock, comprising a drive wheel described above and a feed chain.

One preferred refinement of the feeding system provides that the feed chain comprises a multiplicity of baffle disks, wherein the baffle disks comprise a baffle disk material or are composed thereof. Furthermore, one preferred refinement of the feeding system is characterized in that the baffle disk material is a plastics material or comprises plastics material. It is, in particular, preferable herein that the baffle disk material is polyamide, in particular, fiber-reinforced polyamide, or comprises polyamide, in particular, fiber-reinforced polyamide.

According to one further aspect of the invention, the object mentioned at the outset is achieved by a gear rim for a drive wheel described above, wherein the gear rim comprises a toothed external circumferential face, wherein the external circumferential face has a multiplicity of tooth elements, wherein each tooth element has two tooth tips and one chain clearance that is disposed between the two tooth tips, wherein the gear rim has an elastic gear rim material or is composed thereof.

According to one further aspect of the invention, the object mentioned at the outset is achieved by a method for producing a drive wheel described above, the method comprising: shaping a base wheel having an axial passage for receiving a drive shaft, shaping a gear rim having a toothed external circumferential face, wherein the external circumferential face has a multiplicity of tooth elements, wherein each tooth element has two tooth tips and one chain clearance that is disposed between the two tooth tips, wherein the gear rim comprises an elastic gear rim material or is composed thereof.

The shaping comprises, in particular, primary forming methods, such as, for example, casting in which components can be made in an integral manner. Further, subtractive manufacturing methods, such as, for example, turning or milling, can follow.

According to one further aspect of the invention, the object mentioned at the outset is achieved by a method for driving a feed chain for dry-feeding livestock, the method comprising: driving a feed chain by means of a drive wheel described above.

According to one further aspect of the invention, the object mentioned at the outset is achieved by a method for refurbishing a drive wheel for driving a feed chain for dry-feeding livestock, the method comprising: removing a gear rim from a drive wheel, and disposing a gear rim described above on the drive wheel.

According to one further aspect of the invention, the object mentioned at the outset is achieved by the use of a drive wheel described above in a feeding system for dry-feeding livestock.

In terms of the advantages, variants of embodiment, and details of embodiment of said further aspects and the potential refinements thereof reference is made to the above description pertaining to the corresponding features of the drive wheel.

BRIEF DESCRIPTION OF THE DRAWINGS

Preferred exemplary embodiments will be described in an exemplary manner by means of the appended Figures in which.

DETAILED DESCRIPTION OF THE EMBODIMENTS

Identical elements, or elements of substantially equivalent function, are provided with the same reference signs in the figures. General descriptions typically refer to all embodiments, to the extent that differences are not explicitly stated.

Figure 1:
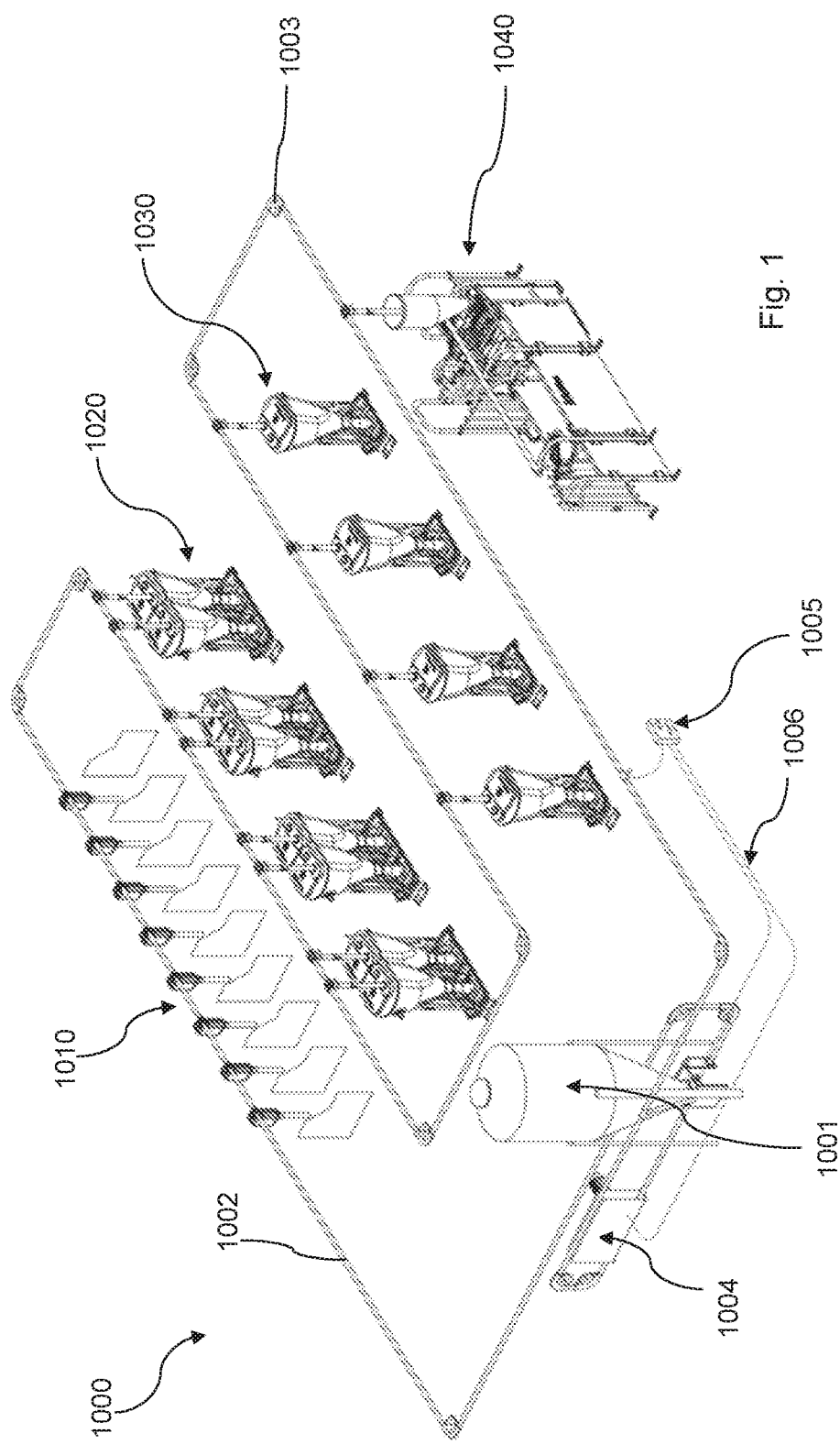
FIG. 1 is a schematic perspective view of an exemplary embodiment of a feeding system for dry-feeding.

FIG. 1 shows a schematic illustration of an exemplary embodiment of a feeding system 1000 for dry-feeding pigs. The feeding system 1000 comprises a feed silo 1001 from which dry feed is conveyed to feeding stations by way of a feed line 1002.

Figure 3:
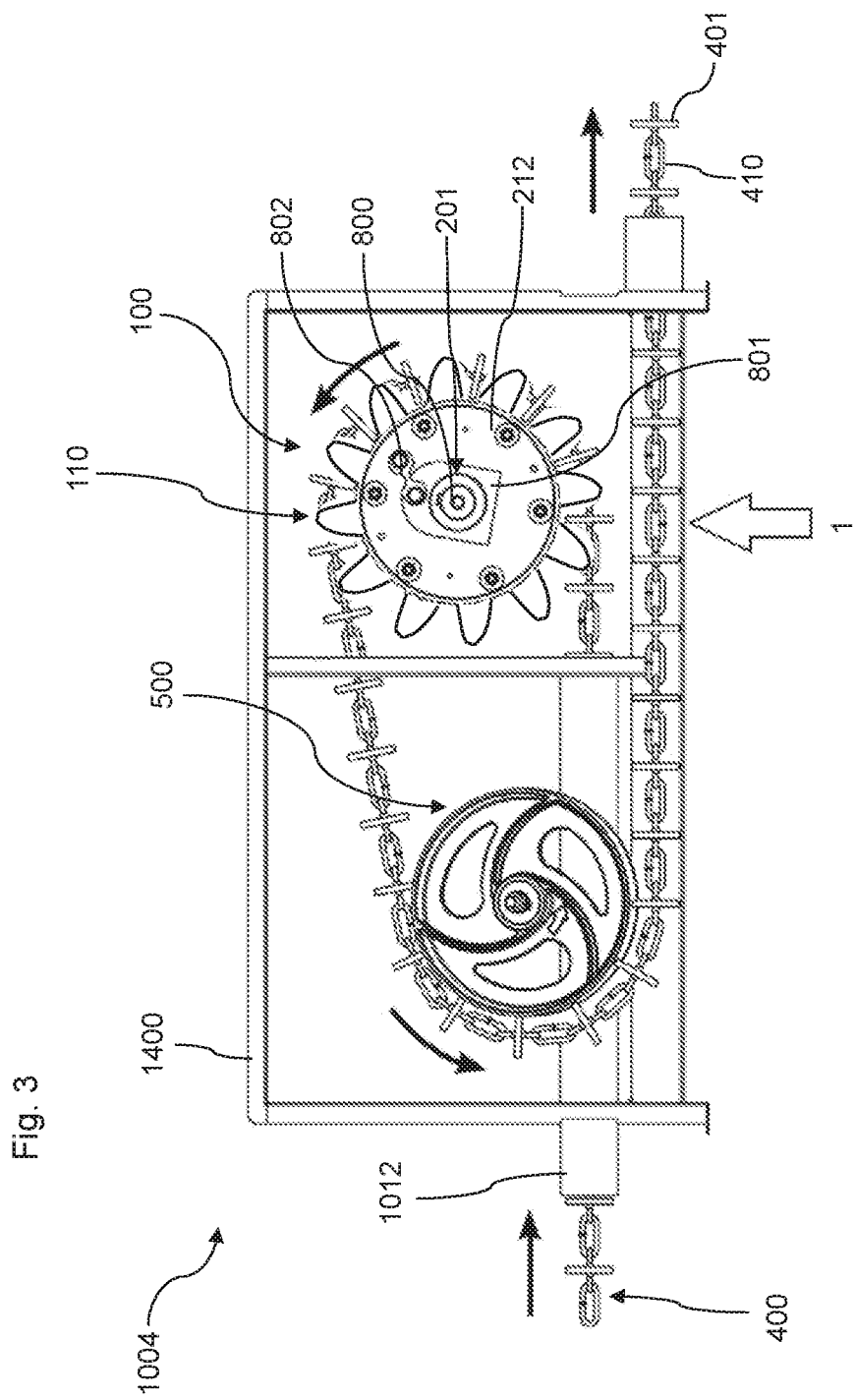
FIG. 3 is a front view of an exemplary embodiment of a drive unit.

The feed line 1002 is typically configured as a conveyor pipe 1012, as best shown in FIG. 3, and can run by way of a plurality of deflection elbows 1003, for example. A feed chain 400 runs within the conveyor pipe 1012 of the feed line 1002.

Figure 5:
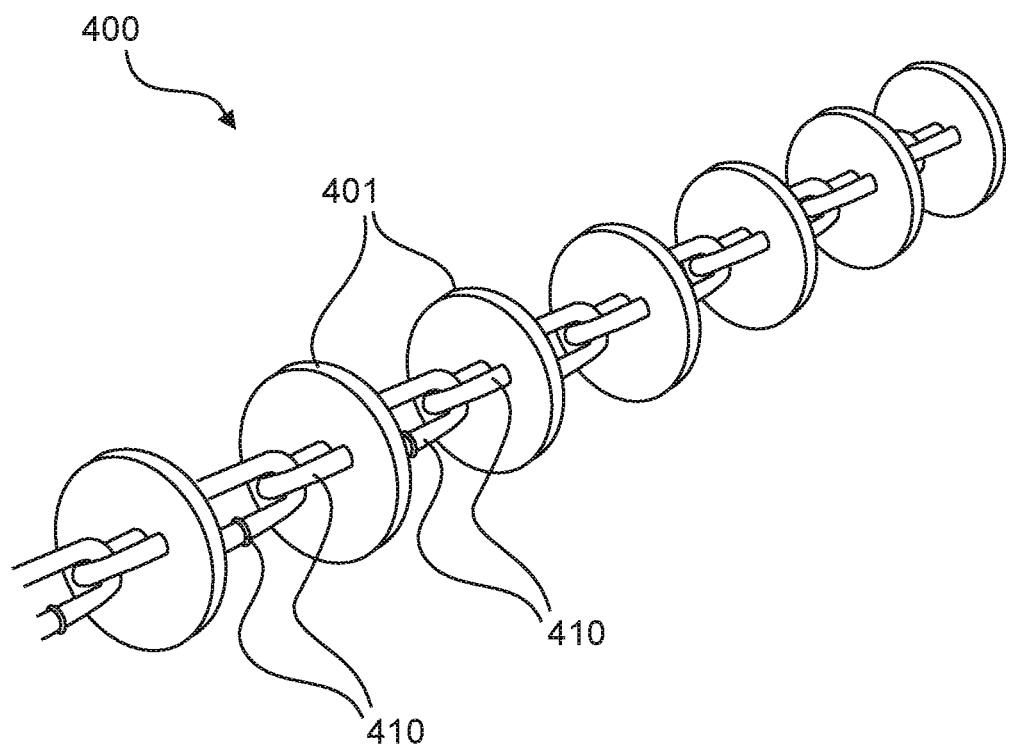
FIG. 5 is a perspective view of an exemplary embodiment of a feed chain.
Figure 6:
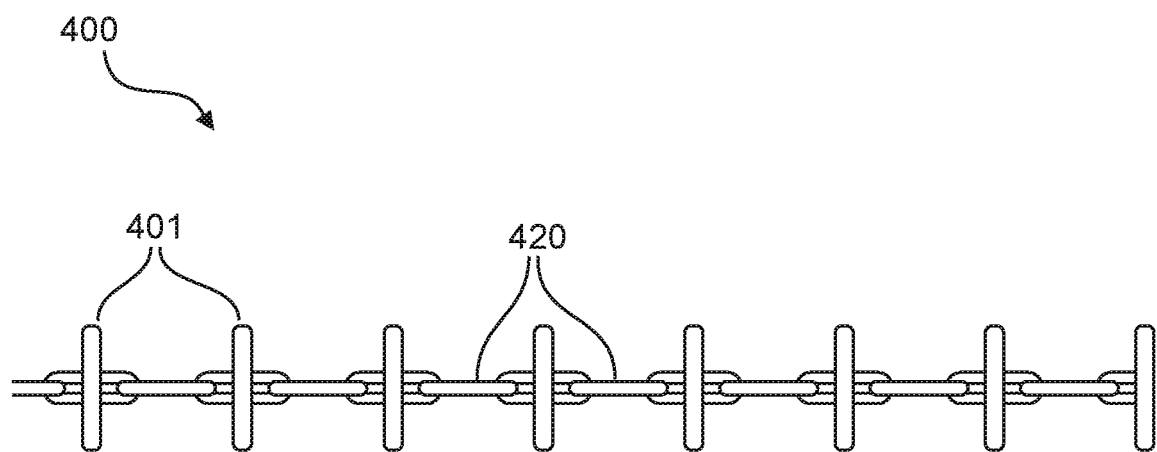
FIG. 6 is a side view of an exemplary embodiment of a feed chain.

The feed chain 400, which can, in particular, also be seen in FIGS. 5 and 6, has mutually spaced-apart baffle disks 401 which are connected to one another by way of chain links 410 or cable portions 420.

The feeding system 1000 has a drive unit 1004 by way of which the feed chain 400 is moved along the feed line 1002. The feed chain 400 is preferably configured as a continuous feed chain. A feeding system 1000 can, in particular, have feeding stations for individual animal feeding 1010, feeding stations for supply of automatic feeders 1020 for breeding piglets, feeding stations for the supply of automatic feeders 1030 for fattening, and/or feeding stations for the supply of on-demand feeding stations 1040 for pregnant sows in group pens.

The feeding system 1000 furthermore preferably has a control unit 1005 which by way of control signal lines 1006 is connected to the drive unit 1004 and/or the feed silo 1001, in particular, a metering unit of the feed silo 1001.

Figure 2:
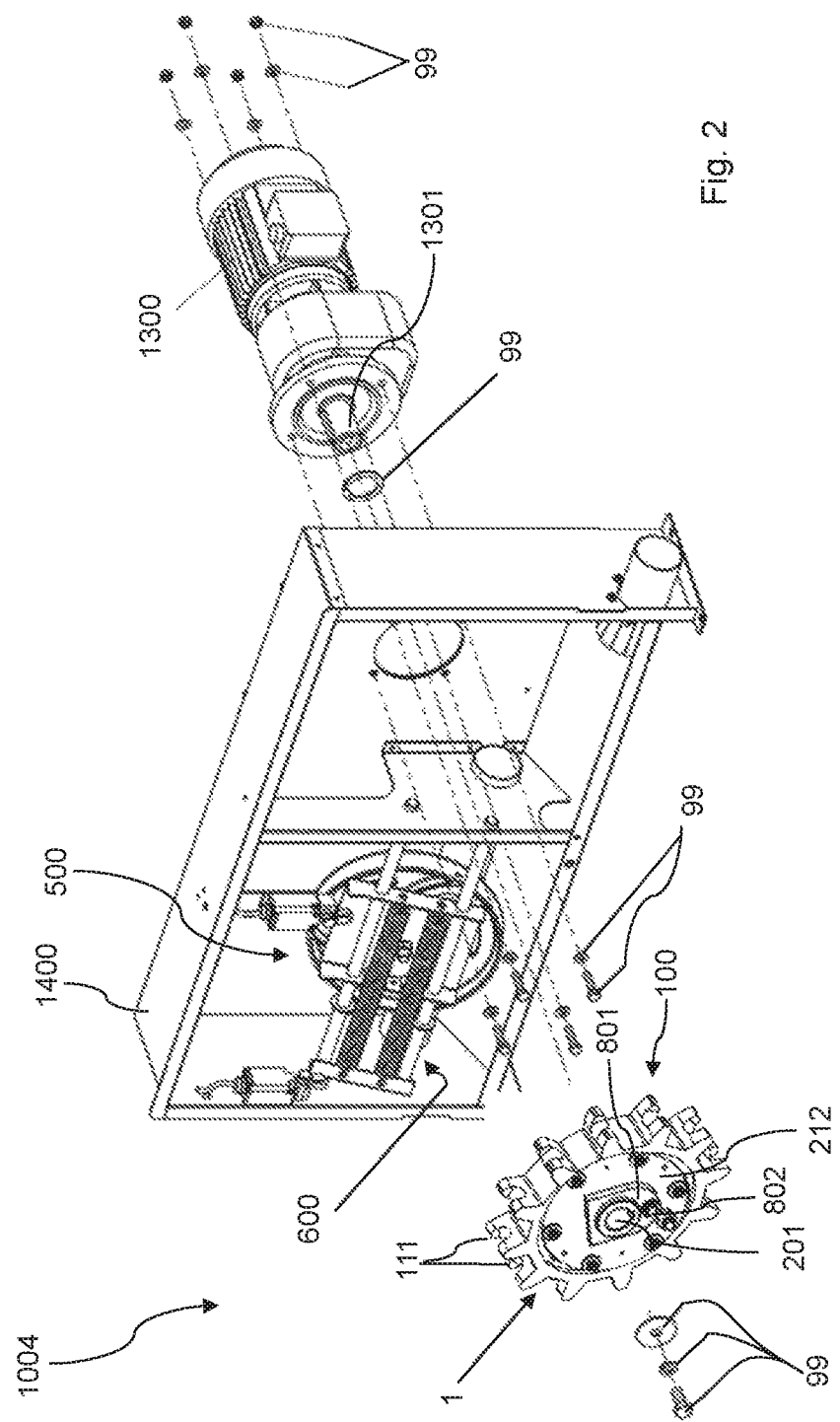
FIG. 2 is an exploded perspective view of an exemplary embodiment of a drive unit.

As can be seen, in particular, in FIGS. 2 and 3, the drive unit 1004 within a frame 1400 has a drive wheel 1 and an idler wheel 500. The idler wheel 500 is tensioned by way of a tensioning unit 600. A drive 1300 drives the drive wheel 1 by way of the drive shaft 1301 which is received in an axial passage 201 of the drive wheel 1. The drive wheel 1 is connected to the drive 1300 of the drive shaft 1301 by way of fastening elements 99.

As can be seen, in particular, in FIG. 3 and also in the arrows plotted therein, the drive wheel 1 serves for driving a conveyor chain 400 which in the conveyor pipe 1012 runs into the drive unit 1004 and for converting torque that is transmitted from the drive 1300 to the drive wheel 1 by way of the drive shaft 1301 to an advancing movement of the conveyor chain 400. The idler wheel 500 is provided in the drive unit 1004 so that the conveyor chain 400 maintains the fundamental direction of movement thereof. In order for the conveyor chain 400 be driven, the drive wheel 1 has a plurality of tooth elements 110 which come to engage with baffle disks 401 of the feed chain 400.

Figure 4:
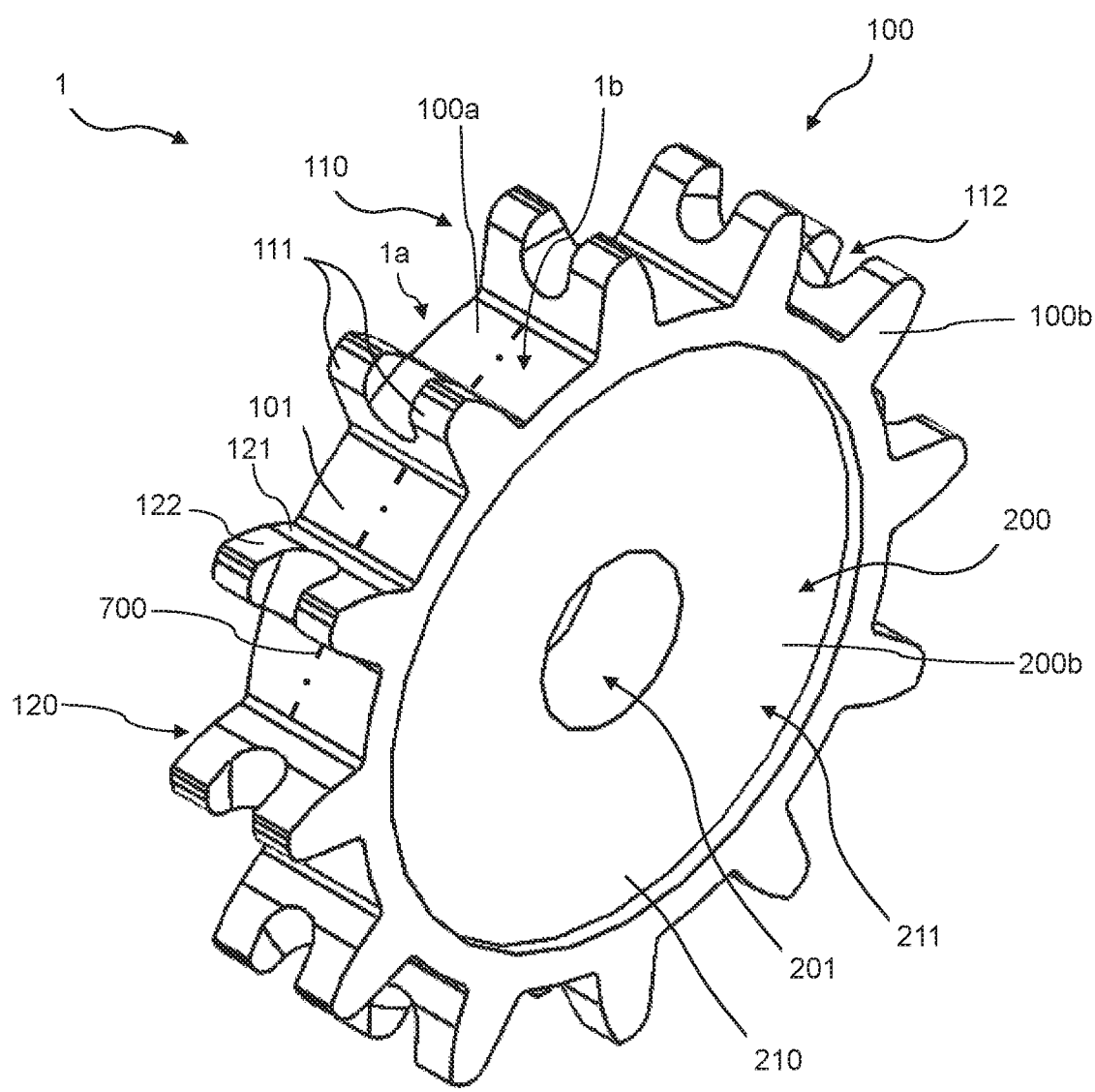
FIG. 4 is a perspective view of an exemplary embodiment of a drive wheel.

As can be seen, in particular, in FIG. 4, the drive wheel 1 has a base wheel 200 having an axial passage 201 for receiving the drive shaft 1301. The drive wheel 1 furthermore has a gear rim 100 having a toothed external circumferential face. The external circumferential face has a multiplicity of tooth elements 110, which in the circumferential direction are mutually spaced apart in an equidistant manner. A tooth root surface 101 is in each case configured between the tooth elements 110. Each tooth element has two tooth tips 111 which are spaced apart in the axial direction and between which a chain clearance 112 is disposed. As can be seen, in particular, in FIGS. 3, 7, and 8, the chain links 410, or the cable portions 420, respectively, of the feed chain 400 run in the chain clearances 112 of the tooth elements 110 when the baffle disks 401 are in engagement with the corresponding tooth elements 110.

Each of the tooth elements 110 has a baffle disk bearing face 120, which has a first portion 121 and a second portion 122. The first portion 121 in relation to the axial passage 201 in the axial direction has a smaller spacing than the second portion 122. The tooth tips 111 are configured in the second portion 122. The first portion 121 and the second portion 122 are inclined toward one another. The first and/or the second portion 121, 122 can, in particular, be curved, for example, having a preferably variable radius. The baffle disk bearing face 120, in particular, the first and/or the second portion 121, 122, can have a contoured surface.

As can furthermore be seen, in particular, in FIG. 4, a first lateral face 210 of the base wheel 200 is recessed in relation to the gear rim 100 and has a first receptacle 211 for a first stabilizer disk 212. A second receptacle for a second stabilizer disk is preferably configured on the side of the base wheel 200 that is opposite in the radial direction, a second stabilizer disk being disposed in said second receptacle. The receptacles and stabilizer disk are preferably disposed so as to be coaxial with the axial passage 201.

The drive wheel 1 is configured so as to be split into two parts, having a first and a second part 1a, 1b. The gear rim 100 is likewise configured so as to be split into two parts, having a first and a second part 100a, 100b, and the base wheel 200 is also configured so as to be split into two parts 200a, 200b, wherein only the second part 200b of the base wheel 200 can be seen in FIG. 4. The base wheel 100 is split into the two parts 1a, 1b, along the separating plane 700, wherein the separating plane 700 is disposed so as to be orthogonal to the axial passage 201. The separating plane 700 simultaneously forms the separating plane between the first and the second parts 100a, 100b of the gear rim 100, and between the first and the second parts of the base wheel 200. This design embodiment split into two parts has the advantage that the tooth tips 111 and chain clearances 112 can be more easily produced in the primary forming, in particular, casting in an open mold, of the respective parts.

The first part 100a of the gear rim 100 and the first part 200a (not shown) of the base wheel 200 are preferably configured so as to be integral and produced as a casting, in particular, as a vacuum casting, by casting in an open mold. The second part 100b of the gear rim 100 and the second part 200b of the base wheel 200 are preferably configured so as to be integral and produced as a casting, in particular, as a vacuum casting by casting in an open mold.

The gear rim 100, in particular, the two parts 100a, 100b thereof, and preferably also the base wheel 200, in particular, the two parts thereof 200a, 200b, are preferably configured from the same material, that is to say, that the gear rim material and the base material are preferably identical.

The gear rim material is an elastic material, in particular, having a SHORE hardness A between 90 and 120. The elastic gear rim material is preferably a plastics material, in particular, an elastic polymer such as preferably polyurethane.

On account of the preferred integral design embodiment of the respective first parts of the gear rim 100 and of the base wheel 200, and of the respective second parts of the gear rim 100 and of the base wheel 200, the drive wheel 1 illustrated in FIG. 4 overall thus has an elastic material. It is, therefore, preferable that stabilizer disks are disposed in the receptacles of the base wheel 200 and are preferably configured so as to be less elastic and thus ensure an increased stability of the base wheel 200 are provided. The stabilizer material of the stabilizer disks is preferably steel, in particular, a steel casting.

Figure 7:
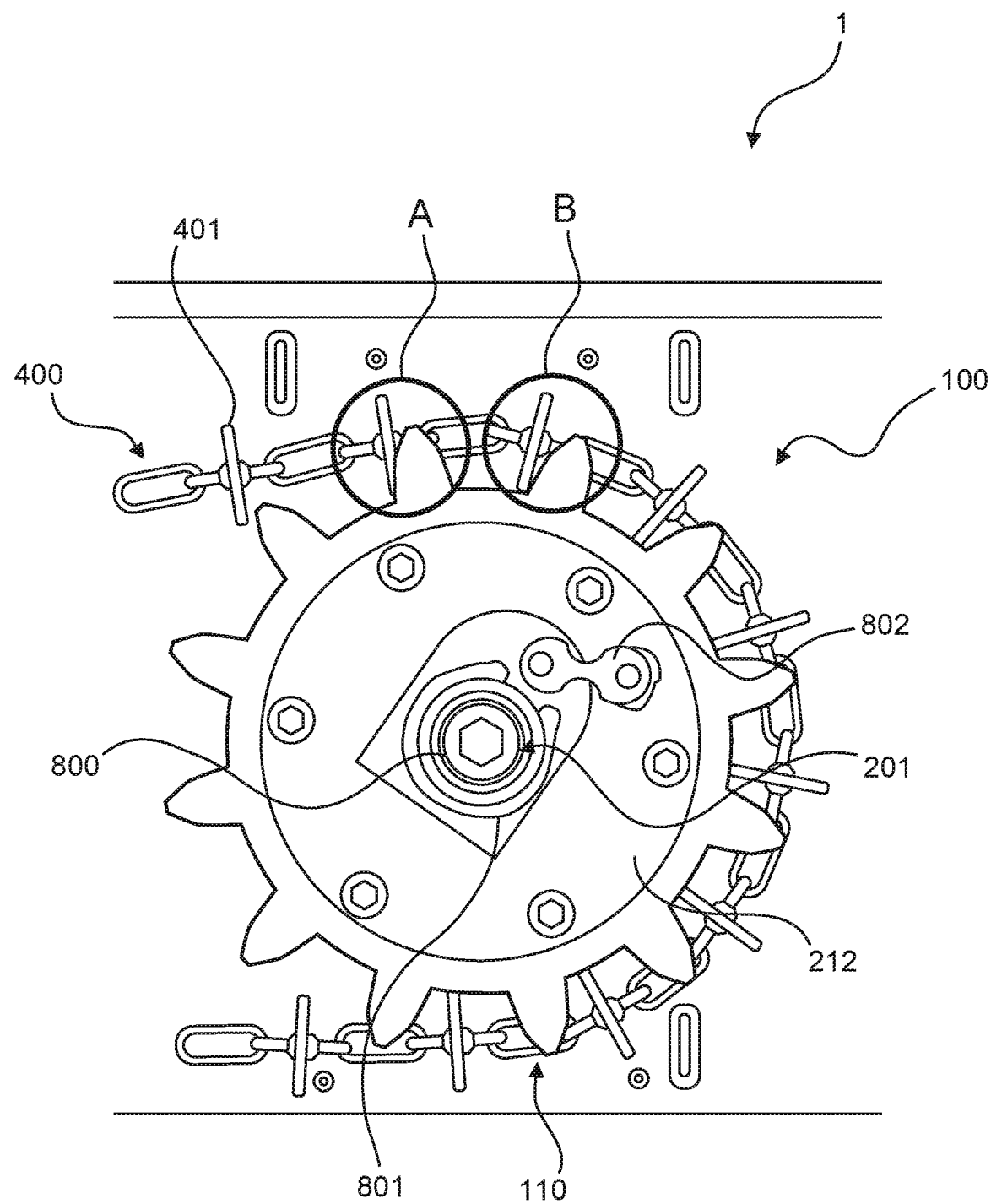
FIG. 7 is a schematic side view of a feed chain in engagement with an exemplary embodiment of a drive wheel under minor stress.
Figure 8:
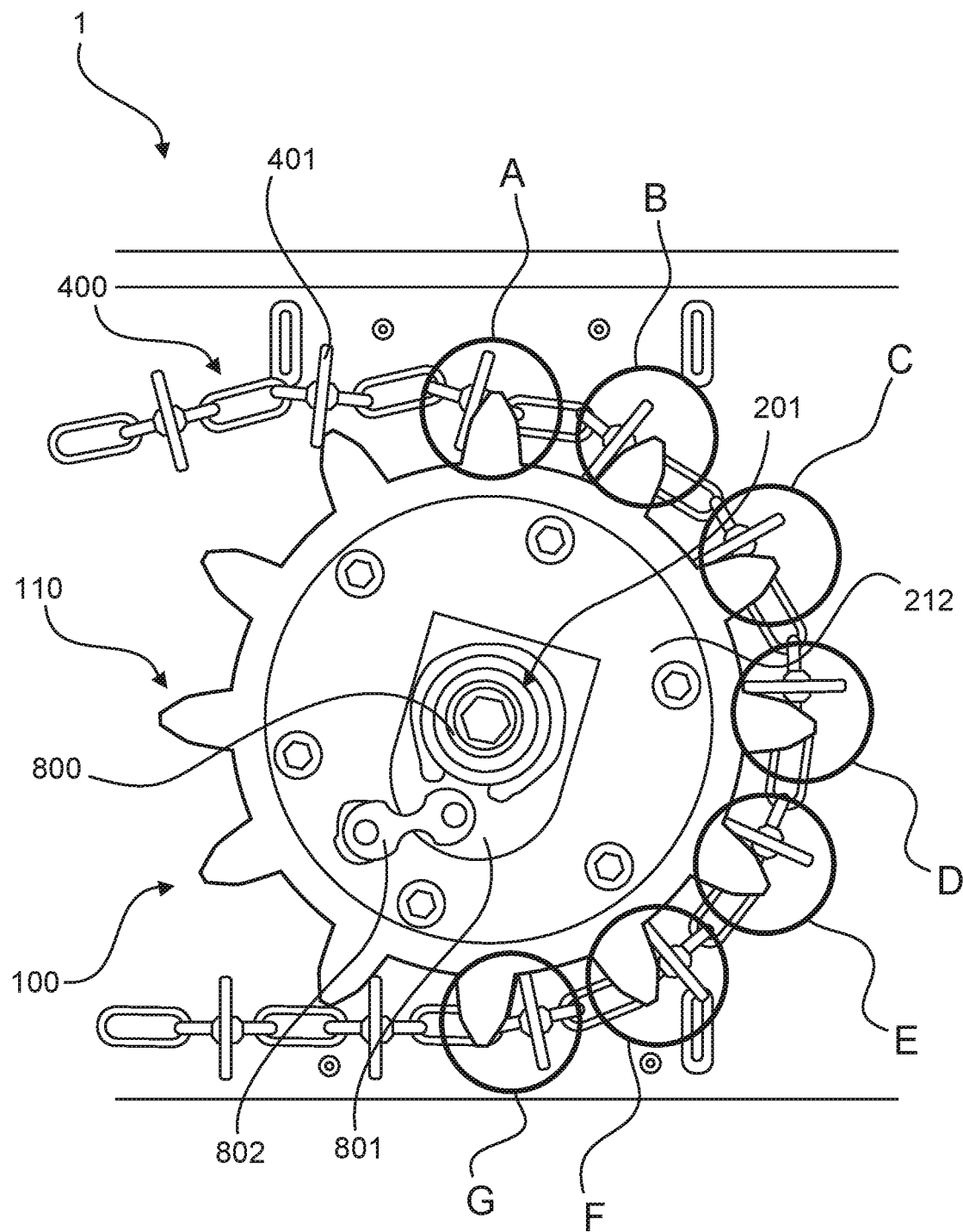
FIG. 8 is a schematic side view of a feed chain in engagement with an exemplary embodiment of a drive wheel under high stress.

The stabilizer disks 212, best shown in FIGS. 7, 8, preferably also serve for transmitting a force from the drive shaft 1301 to the base wheel 200. The transmission of force preferably takes place from the drive shaft 1301 to the hub 800 by way of a shaft-to-hub connection. A connector plate 801 is preferably connected to the hub 800 in a force-fitting and/or form-fitting and/or materially integral manner. The transmission of force to the stabilizer disk 212 preferably takes place by way of a load protection 802 which is configured as a constricted sheet-metal part, for example. It is preferably provided that the stabilizer disk 212 thereafter transmits the force to the base wheel 200.

Various advantages result on account of the use of an elastic gear rim material and preferably also on account of the design embodiment of the tooth elements 110, in particular, of the baffle disk bearing face 120, described herein.

The engagement between the baffle disks 401 and the tooth elements 110, in particular, the baffle disk bearing face 120, can be improved on account thereof, on the one hand.

The elastic deformation of the tooth elements 110, in particular, under high stress, and the design embodiment of the baffle disk bearing faces 120, as is illustrated in FIGS. 7 and 8, furthermore enables that a larger number of baffle disks 401 come to engage with a correspondingly larger number of tooth elements 110.

FIG. 7 shows a situation under only minor stress (thus of a very short feed chain 400 and/or a only very minor quantity of feed be conveyed, for example), in which only two baffle disks 401 are in engagement with two tooth elements 110, as is highlighted by A and B.

By contrast, a situation under high stress in which the tooth elements 110 which are in engagement with baffle disks 401 are elastically deformed is shown in FIG. 8, such that overall a number of seven baffle disks 401 are in engagement with the corresponding tooth elements 110, as is highlighted in FIG. 8 by A to G.

In this way, a significantly longer feed chain 400 can be moved, or a larger quantity of feed can be conveyed, respectively. The elastic design embodiment of the gear rim 100 simultaneously reduces the wear on the feed chain 400 as well as on the conveyor pipe 1012, since any beating of the conveyor chain 400 is reduced or minimized. On account thereof, the noise pollution is also reduced, which in turn benefits the well-being of the animals.

The invention claimed is:

1. A drive wheel for driving a feed chain for dry-feeding livestock, comprising:
 a base wheel having an axial passage for receiving a drive shaft; and a gear rim having a toothed external circumferential face;

wherein the external circumferential face has a multiplicity of tooth elements;

wherein each tooth element has two upwardly extending tooth tips and a chain clearance that is disposed between the two upwardly extending tooth tips;

wherein the gear rim including the tooth elements is composed of an elastic gear rim material; and wherein the elastic gear rim material is a plastics material.

2. The drive wheel according to claim 1, wherein the gear rim material has a SHORE hardness A of at least 90 and/or at most 120.

3. The drive wheel according to claim 1, wherein each tooth element has one baffle disk bearing face, and wherein the baffle disk bearing face has a first portion and a second portion.

4. The drive wheel according to claim 3, wherein:
the first portion and the second portion of the baffle disk bearing face are inclined toward one another;
the first and/or the second portion of the baffle disk bearing face are/is curved;
the first and/or the second portion of the baffle disk bearing face have/has a variable radius; and/or
the first and/or the second portion of the baffle disk bearing face have/has a contoured surface.

5. The drive wheel according to claim 1, wherein the base wheel comprises a base material or is composed thereof.

6. The drive wheel according to claim 1, wherein:
the gear rim material and the base material are identical; and/or the gear rim material is polyurethane or comprises polyurethane.

7. The drive wheel according to claim 1, wherein:
the gear rim and the base wheel are configured so as to be integral; and/or
the gear rim and/or the base wheel are/is configured as a vacuum casting.

8. The drive wheel according to claim 1, wherein:
the gear rim is configured so as to be split in two parts, wherein a separating plane is disposed between the first and the second part of the gear rim, so as to be orthogonal to the axial passage;
the base wheel is configured so as to be split in two parts, wherein a separating plane is disposed between the first and the second part of the base wheel, so as to be orthogonal to the axial passage;
the first part of the gear rim and the first part of the base wheel are configured so as to be integral, and/or the second part of the gear rim and the second part of the base wheel are configured so as to be integral; and/or
the first part of the gear rim and the first part of the base wheel are configured as a vacuum casting, and/or the second part of the gear rim and the second part of the base wheel are configured as a vacuum casting.

9. A feeding system for dry-feeding livestock, comprising a drive wheel according to claim 1 and further comprising the feed chain.

10. A gear rim for a drive wheel according to claim 1, wherein:
the gear rim comprises the toothed external circumferential face;
the external circumferential face has the multiplicity of tooth elements;
each tooth element has the two upwardly extending tooth tips and the chain clearance is disposed between the two upwardly extending tooth tips;
the gear rim is composed of the elastic gear rim material; and
the elastic gear rim material is the plastics material.

11. A method for producing a drive wheel according to claim 1, the method comprising the steps of:
shaping the base wheel having the axial passage for receiving the drive shaft; and
shaping the gear rim having the toothed external circumferential face;
wherein the external circumferential face has the multiplicity of tooth elements;
wherein each tooth element has the two upwardly extending tooth tips and the chain clearance is disposed between the two upwardly extending tooth tips;
wherein the gear rim is composed of the elastic gear rim material; and
wherein the elastic gear rim material is the plastics material.

12. A method for driving a feed chain for dry-feeding livestock, the method comprising the step of driving the feed chain by means of the drive wheel according to claim 1.

13. A method for refurbishing a drive wheel for driving a feed chain for dry-feeding livestock, the method comprising the steps of:
removing a gear rim from a drive wheel; and
disposing a gear rim according to claim 10.

14. The use of a drive wheel according to claim 1 in a feeding system for dry-feeding livestock.

15. A drive wheel for driving a feed chain for dry-feeding livestock, comprising:
a base wheel having an axial passage for receiving a drive shaft; and
a gear rim having a toothed external circumferential-face;
wherein the external circumferential face has a multiplicity of tooth elements;
wherein each tooth element has two upwardly extending tooth tips and a chain clearance that is disposed between the two upwardly extending tooth tips;
wherein:
the gear rim including the tooth elements is composed of an elastic gear rim material;
the elastic gear rim material is a plastics material;
a first lateral face of the base wheel is recessed in relation to the gear rim and forms a first receptacle for a first stabilizer disk;
a second lateral face of the base wheel is recessed in relation to the gear rim and forms a second receptacle for a second stabilizer disk;
a first stabilizer disk is disposed in the first receptacle of the first lateral face of the base wheel; and/or
a second stabilizer disk is disposed in the second receptacle of the second lateral face of the base wheel.

* * * * *

UNITED STATES PATENT AND TRADEMARK OFFICE
CERTIFICATE OF CORRECTION

PATENT NO. : 11,254,509 B2
APPLICATION NO. : 16/574138
DATED : February 22, 2022
INVENTOR(S) : Gerhardt-Hansen et al.

It is certified that error appears in the above-identified patent and that said Letters Patent is hereby corrected as shown below:

In the Claims

Column 12, Claim 15, Line 38, "circumferential-face" should be --circumferential face--.

Signed and Sealed this
Seventeenth Day of May, 2022

Katherine Kelly Vidal
*Director of the United States Patent and Trademark Office*